June 12, 1956 W. E. GEORGE 2,749,756
TRENCHER DRIVE MECHANISM
Filed June 21, 1954 4 Sheets-Sheet 1

Inventor
Warren E. George
Carlson, Pitzner, Hubbard + Wolfe
Atty's

June 12, 1956 W. E. GEORGE 2,749,756
TRENCHER DRIVE MECHANISM
Filed June 21, 1954 4 Sheets-Sheet 3

Inventor
Warren E. George
Carlson, Pitzner, Hubbard + Wolfe
Atty's

June 12, 1956  W. E. GEORGE  2,749,756
TRENCHER DRIVE MECHANISM
Filed June 21, 1954  4 Sheets-Sheet 4

Inventor
Warren E. George
Carlson, Pitzner, Hubbard + Wolfe
Atty's

United States Patent Office 2,749,756
Patented June 12, 1956

2,749,756

TRENCHER DRIVE MECHANISM

Warren E. George, Auburn, Nebr., assignor to Auburn Machine Works, Inc., Auburn, Nebr., a corporation of Nebraska Application June 21, 1954, Serial No. 438,182

8 Claims. (Cl. 74—15.86)

The present invention relates to trenching equipment and more particularly to mechanism for driving a trenching vehicle or tractor at crawling speed.

It is an object of the present invention to provide an improved trencher drive arrangement which is capable of driving the tractor forwardly at a crawling speed using power derived from the power take-off. It is another object to provide a trencher drive unit having sliding gears for uncoupling the rear wheels and in which novel means are provided to release the load on the driving train automatically prior to moving the gears out of engagement. It is a more detailed object to provide an unlocking drive unit for a trencher in which a single operation of a manual control member acts sequentially to release the load and to disconnect the unit from the tractor transmission. It is a further object to provide a drive unit of the above type which is particularly well suited for use with a power take-off which rotates in only one direction.

It is still another object to provide an unlocking drive unit which receives power at reduced speed from the tractor power take-off and which is mounted directly on the transmission housing for feeding power to one of the wheel driving gears in the tractor transmission. It is yet another object to provide an unlocking drive unit which is capable of direct bolting to the transmission housing of a standard tractor and having a drive gear which projects inwardly into the transmission housing for meshed engagement with one of the spur gears in the transmission.

Finally it is an object to provide an unlocking drive unit which is simple in construction, which is inexpensive to manufacture and which can be readily installed on or removed from a tractor transmission.

Other objects and advantages of the invention will become apparent upon reading the following detailed discussion and upon reference to the attached drawings in which.

While the invention will be described in connection with a preferred embodiment, it will be understood that I do not intend to limit the invention to such embodiment but, on the contrary, intend to cover such alternative embodiments and constructions as may be included within the spirit and scope of the appended claims.

Figure 1:
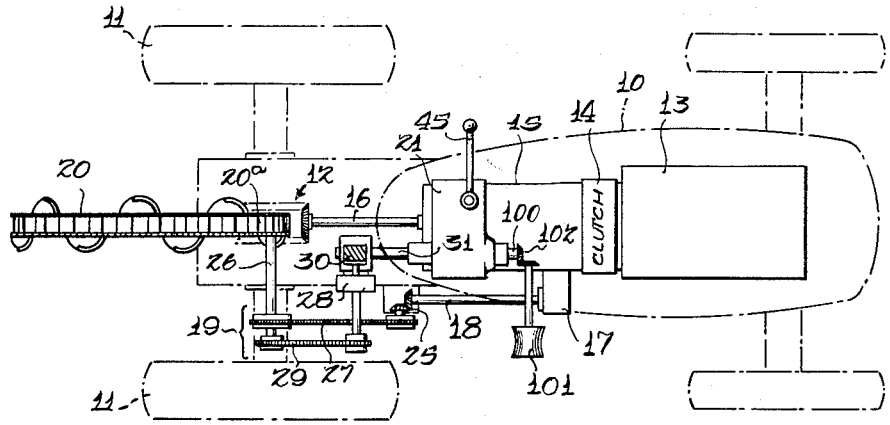
Figure 1 is a diagram showing the driving arrangement in a tractor-mounted trencher employing the present invention.

Turning now to Fig. 1, there is shown diagrammatically trenching equipment mounted on a tractor and including an arrangement for driving the tractor at slow crawling speed and for driving a digger chain using power derived from the tractor power take-off. In this figure, the tractor is indicated in dot-dash outline at 10. The tractor includes a pair of driving wheels 11 driving from a differential 12. Under conditions of transport the rear wheels are driven in the usual fashion, power obtained from the engine 13 being fed through a clutch 14 to a transmission 15 having a drive shaft 16 which is coupled to the differential. Extending from the transmission 15 is a power take-off or "PTO" 17 having a PTO shaft 18. Power from the PTO shaft passes through a step-down drive connection indicated generally at 19, a portion of the power being used to drive a digger chain 20 while a portion of the power is diverted to drive an unlocking drive unit 21 constructed in accordance with the invention and which is coupled to one of the gears in the transmission.

Referring to the driving train more specifically, the PTO shaft engages a right angle drive connection 25, power being transmitted from the connection 25 to a cross shaft 26 by means of a chain 27. From the cross shaft 26, power is transmitted to an hydraulic coupling 28 via a belt 29. The hydraulic coupling 28 does not per se form a part of the invention and is of the manually disengageable type in which the output rotates substantially 1:1 with the input when it is fully engaged. Arranged adjacent the coupling 28 is a speed reducer 30 of any desired type as, for example, a worm and worm wheel. The output of the reducer 30 is connected to the drive unit 21 by a drive unit input shaft 31. As indicated in Fig. 1, the cross shaft 26 also serves to drive the digger chain 20 by means of a digger chain sprocket 20a.

Figure 2:
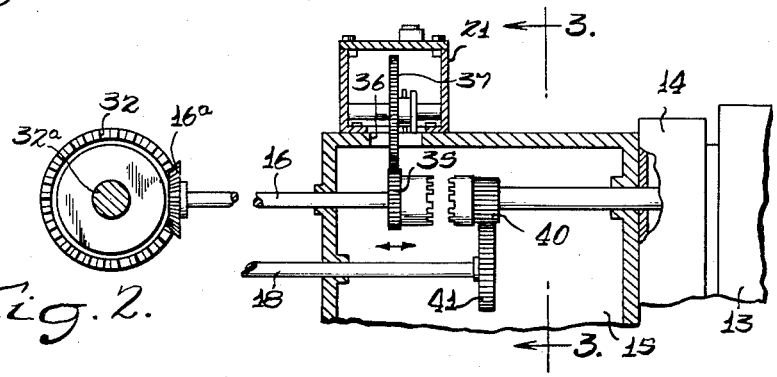
Fig. 2 is a longitudinal section through the transmission housing, simplified and with certain parts indicated diagrammatically to illustrate the coupling between the improved drive unit and the tractor transmission.
Figure 3:
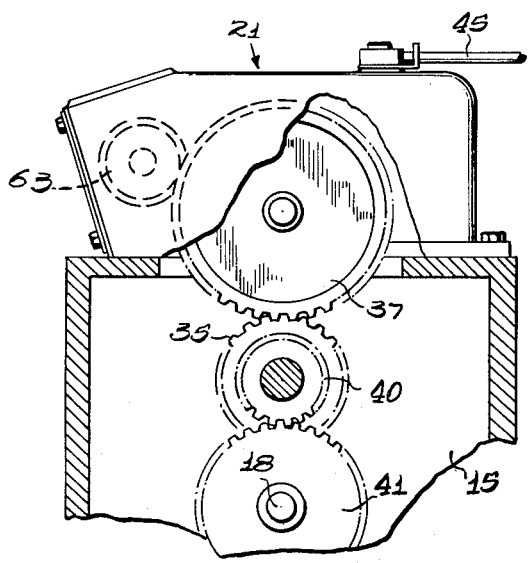
Fig. 3 is a view taken along the line 3—3 in Fig. 2.

In order to understand the path over which power is transferred from the drive unit 21 through the tractor transmission to the tractor rear wheels, reference is made to Figs. 2 and 3. In Fig. 2 the transmission 15 is in vertical section and all of the gears have been omitted except those gears which are active under trenching conditions. The output shaft 16 of the transmission carries a gear 16a which meshes with a gear 32 to drive the rear wheel drive shaft 32a. Mounted on the forward or driving end of the output shaft 16 within the transmission is a spur gear 35. Such gear is opposite an access hole 36 formed in the top of the transmission housing. Extending downwardly from the drive unit through the access hole is a main drive gear 37 which meshes, during trenching, with gear 35. Prior to reviewing the operation of the device thus far described, it will be noted in Fig. 2 that the engine shaft carries a constantly running gear 40 which is meshed with a PTO gear 41 driving the PTO shaft 18 previously referred to.

Under trenching conditions, the regular vehicle transmission 15 is placed in neutral as indicated in Fig. 2, and the vehicle clutch is engaged. Rotation of the PTO shaft 18 causes power to be fed through the hydraulic coupling 28 (Fig. 1) to the speed reducer 30 and thence to the input shaft 31 of the drive unit. Rotation of the input shaft causes corresponding rotation of the main drive gear 37 (Fig. 2). This, in turn, produces rotation of the drive shaft 16 resulting in rotation of the tractor wheels at a crawling speed.

Figure 4:
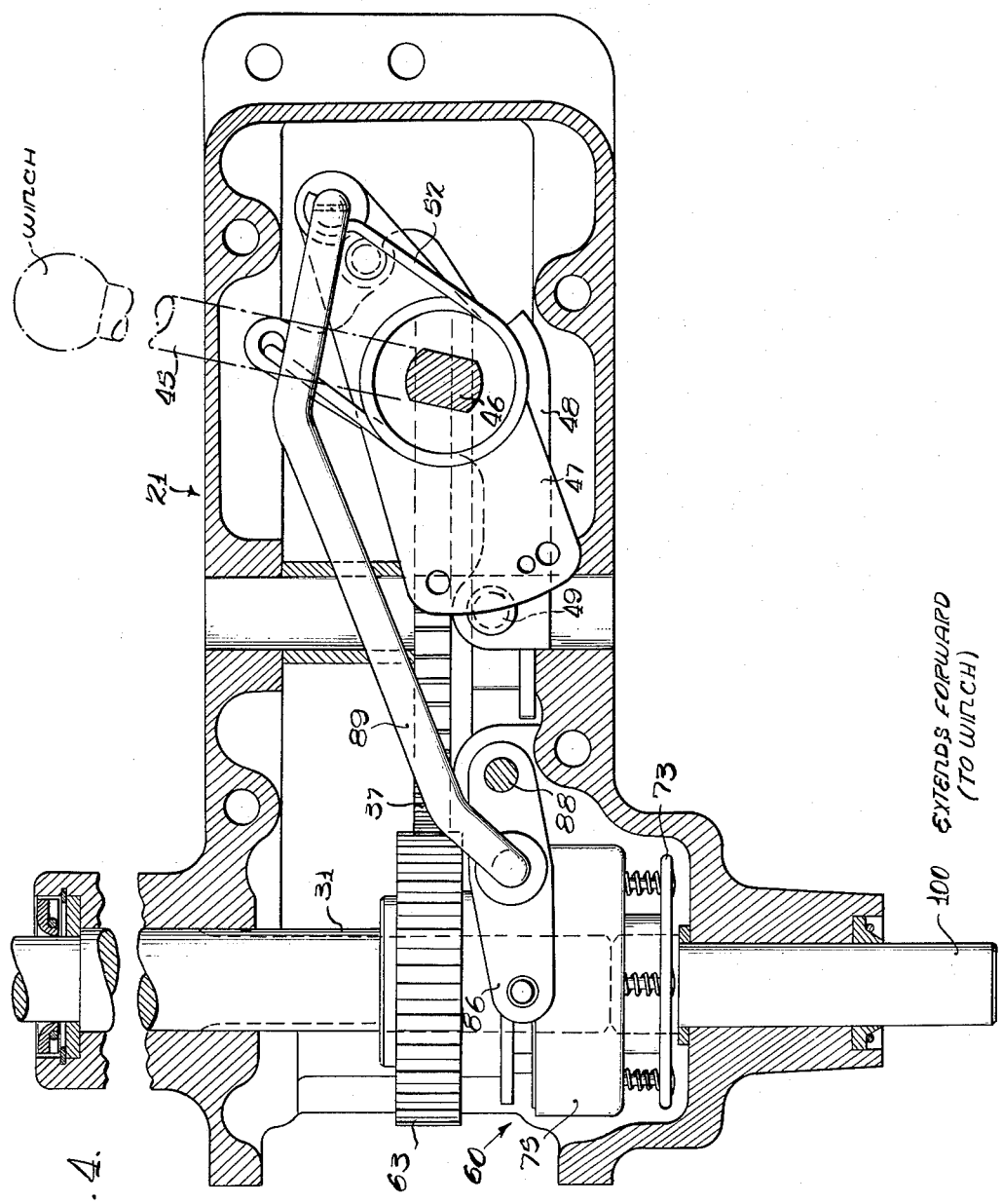
Fig. 4 is a plan view of the unlocking drive unit.
Figure 5:
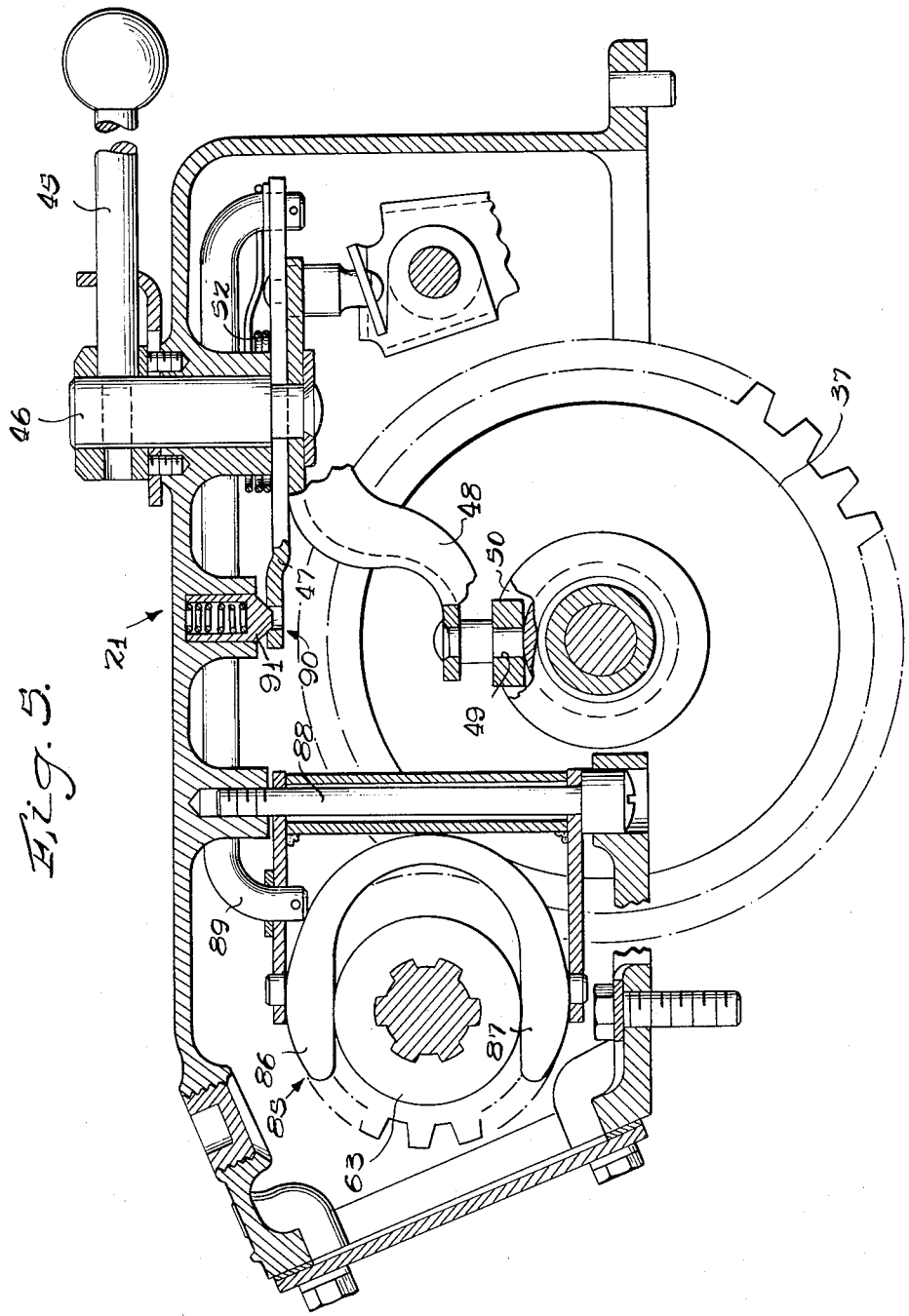
Fig. 5 is an elevation corresponding to Fig. 4.
Figure 6:
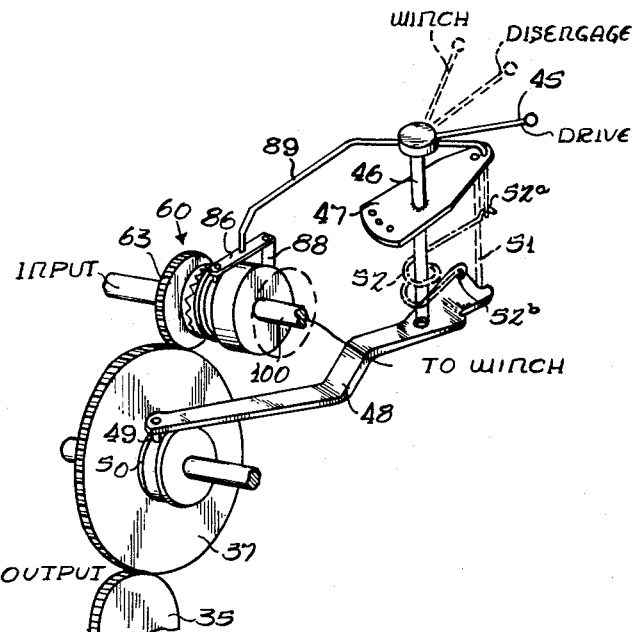
Fig. 6 is a diagram of the mechanism included within the drive unit simplified and partially distorted to bring out the operation.

In accordance with the present invention, means are provided within the drive unit 21 for unloading or unlocking the driving train between the speed reducer 30 and the tractor wheels and for simultaneously producing endwise shifting movement of the main drive gear 37 so that it slips out of driving engagement with the gear 35 which, as stated, is coupled to the tractor rear wheels. The manner in which this is accomplished will be clear upon reference to Figs. 4 and 5 which show plan and elevation views, respectively, of the drive unit taken in connection with the distorted perspective Fig. 6.

For the purpose of moving the main gear 37 axially into and out of meshing engagement with the transmission gear 35, an operating handle 45 is provided mounted on a shaft 46. Connected to the shaft is a sector plate 47. Mounted concentrically with respect to the sector plate 47 is a shifting arm 48. At its outer end the shifting arm 48 carries a pin 49 which rides in a groove 50 formed in the hub of the gear 37. It will be apparent that movement of the operating lever 45 causes endwise sliding of the drive gear 37 into or out of engagement with the spur gear 35 in the transmission.

Further in accordance with the present invention, a positive unlocking device indicated generally at 60 is provided between the input shaft 31 on the drive unit and the main drive gear 37, and means are provided for disengaging the device 60 upon initial movement of the manual operating lever 45 into its "disengage" position. More specifically, a spring-biased lost-motion connection is provided between the operating lever and the shift arm 48 so that the unlocking and shifting operations may occur sequentially. As shown, for example, in Fig. 6, the lost-motion connection includes a downwardly extending pin 51 on plate 47, the pin being arranged to engage a shoulder or abutment on the inner portion of the arm 48. The two members, plate 47 and arm 48, are biased together by a spring 52 having one of its ends anchored at 52a, the other at 52b. As a result, clockwise movement of the handle from the "disengage" to "drive" position causes positive engagement of the gears, while the reverse movement from "drive" to "disengage" causes the main gear 37 to be resiliently urged out of engagement with the gear 35.

Figures 7, 8:
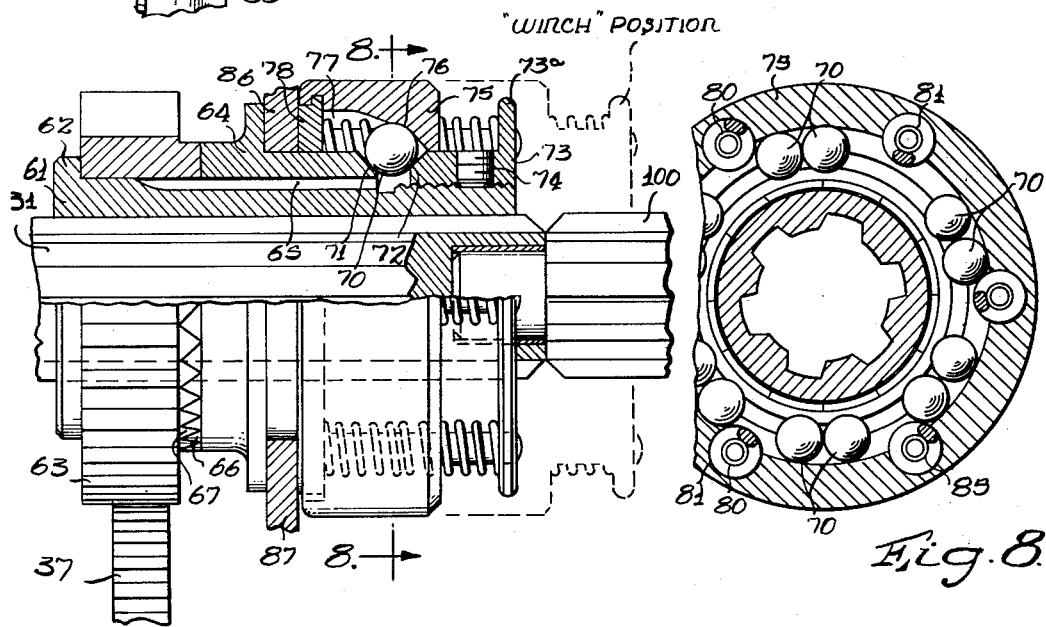
Fig. 7 is a detailed view of the unlocking device in the drive unit taken along a longitudinal section.
Fig. 8 is a transverse section taken along the line 8—8 in Fig. 7.

Before describing the above-mentioned sequential operation, more detailed attention may be given to the unlocking device 60 which is shown in Figs. 7 and 8. Referring to Fig. 7, the input shaft 31 is splined and is engaged by a splined sliding collar 61 having a shoulder 62 formed on its left-hand end for retaining a gear 63 which is rotatable on the collar. For the purpose of normally coupling the gear 63 to the collar 61, an auxiliary or locking collar 64 is provided. The latter collar has a splined connection 65 with the outer surface of the collar 61 and is slidable endwise thereon. The locking collar 64 is provided with a set of axially facing serrations or teeth 66 which mesh with a corresponding set of teeth 67 integrally formed on the gear 63. The teeth are preferably triangular in shape with sloping side walls. It will be apparent that when the locking collar 64 is in its left-hand or locking position as shown in Fig. 7, the teeth 66, 67 will be engaged, causing the gear 63 to be coupled to the input shaft 31.

In carrying out the present invention, means are provided for blocking the collar 64 in its left-hand or locking position, while permitting it to be released for endwise unlocking movement when it is desired to break the driving connection. In the present instance the blocking action is accomplished by a set of balls 70 which ride in a groove formed by the conically-shaped end 71 of the locking collar 64 and by a conical shoulder 72 provided at the left-hand end of the main collar 61. The shoulder 72 is formed on an adjustable collar 73 which is threaded to the main collar 62 and locked in place by a set screw 74. It will be noted in Fig. 7 that the groove defined by the shoulders 71, 72 has a V-shaped cross section. In order to retain the balls 70 seated in the groove under driving conditions while permitting the balls to escape incident to unlocking, an annular cam member 75 is provided having an internal cam surface 76 which flares outwardly to form an annular space 77. The annular space 77 is enclosed by an annular end wall 78 open on the end of the cam member.

For the purpose of urging the annular cam member 75 into the left-hand or locking position, a series of coil springs 80 are provided. These coil springs, six in number, are equally spaced. At the right-hand end the springs are seated against a rim 73a on the adjustable collar 73. At the left-hand end the springs are seated on the end wall 78 which forms a part of the annular cam member 75. It will be noted that the springs actually penetrate into the interior of the cam member for engagement with the end wall 78, access being provided by holes 81.

With the parts of the unlocking device 60 occupying the normal position shown in Fig. 7, it will be apparent that the cam member 75 is urged to the left-hand or locking position under the influence of the springs 80, serving to cam the balls 70 inwardly and forcing the collar 61 into driving engagement with the gear 63. Under such conditions, the gear 63 is rigid with the drive shaft 31.

Figure 9:
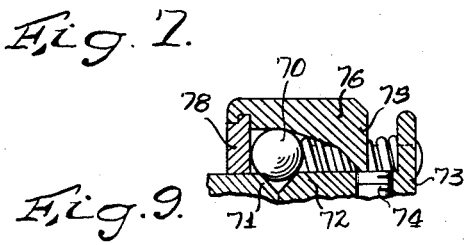
Fig. 9 is a fragmentary section showing the relative positions of the parts in the unlocking device when in the unlocked condition.

To unlock the device 60 a fork 85 is provided having arms 86, 87 interconnected by a pivoted cross member 88. For rocking the fork 85 about its pivot axis, a link 89 is used, such link being pivotally connected to the sector plate 47 at one end and the to the arm 87 of the fork at its other end. It will be apparent that upon counterclockwise movement of the operating handle 45 and sector plate 47 (Fig. 6), tension will be exerted in the link 89 to rock the fork 85 in a direction to compress the springs 80 and to move the cam member 75 in the unlocking device to the right. Movement of the cam member 75 to the right unlocks the balls 70 so that they are free to move outwardly into the annular space 77 in the cam member 75. Releasing the balls 70 serves to unblock the locking collar 64 so that it may be cammed to the right by the camming action between the teeth 66, 67. As a result of such camming action, the unlocking collar 64 moves into the position shown in Fig. 9 in which the teeth are disengaged and in which the gear 63 is free to rotate idly relative to the shaft 31.

It may be noted at this point that the unlocking device 60 acts to disconnect the load regardless of the amount of torque which may exist between the drive shaft 31 and the output gear 37. If excessive torque is present, as frequently occurs under field conditions when the digger chain is caught by an obstruction, such excessive torque simply increases the camming action between the triangular teeth 66, 67, resulting in more prompt release. With the gears 63, 37 "unloaded" there is no longer any resistance to shifting movement of the gear 37. Consequently gear 37 is shifted, by spring 52 and arm 48, to the right into a disengaged position relative to the gear 35 in the tractor.

The device 60 remains unlocked and the gears 35, 37 remain out of engagement as long as the manual lever 45 occupies the "disengage" position, effectively breaking the driving connection between the engine and the tractor rear wheels. When the manual lever 45 is restored to its "drive" position, tensile force is transmitted through the link 89, thereby rotating the arms of the fork 85 to the left as viewed in Fig. 6 and releasing the pressure against the annular cam member 75. Thus released, the cam member 75 is free to move to the left under the urging of the springs 80, camming the balls 70 down into the groove and wedging the locking collar 64 to the left. This engages the teeth 66, 67; simultaneously the gear 37 is slid into mesh with the gear 35, thus reestablishing the driving connection.

The cam angle in the member 75 is preferably made rather shallow as shown so that no amount of torque between the gear 63 and drive shaft 31 is capable of forcing the balls 70 outwardly out of their groove. In short, the unlocking device is self-locking under running conditions but may be easily unlocked using only a small amount of force, an amount of force which is substantially independent of the torque loading.

In order to maintain the manual control lever 45 in one of its set positions, a detent 90 is used. Such detent may conveniently consist of a downwardly biased plunger 91 engaging spaced depressions or holes formed in the sector plate 47.

In accordance with one of the more detailed aspects of the invention, means are provided for establishing a direct drive connection between the input shaft 31 and a winch shaft following disengagement of the main drive gear 37 from the tractor transmission. This is accomplished in the present instance by providing a winch shaft 100 in alinement with the end of the input shaft 31 and by further providing splines on the winch shaft which are engageable by the sliding collar 61 of the unlocking device 60. Thus, upon moving the manual control lever 45 beyond the "disengage" position into a "winch" position, the fork 85 is rotated to move the sliding collar 61 into the position shown in Fig. 4. In such position the sliding collar bridges the ends of the input shaft 31 and the winch shaft to provide positive driving of a winch 101 (Fig. 1) via a 90° coupling 102.

In using the winch a cable is anchored to some stationary object so that the tractor is drawn forwardly independent of wheel traction. It is to be particularly noted that the two types of drive, namely, wheel drive and winch drive, are available only in the respective extreme positions of the manual control lever 45, and while they are under the control of a common control member, they are, nevertheless, interlocked to operate entirely independently of one another. Note also that the winch drive makes use of the cushioning effect of the hydraulic coupling.

While the operation of the device will be apparent to one skilled in the art from the foregoing description, nevertheless, it will be helpful, in order to bring out the sequential operation, to review the operating sequence in detail. It will be appreciated, first of all, that the crawling speeds used during normal digging are extremely slow, being measured in feet per minute rather than miles per hour. Accordingly, an extremely high ratio of speed reduction is used in the speed reducer 30 (Fig. 1) as obtained by a worm and worm wheel. The reduction of speed is accompanied by a corresponding increase in torque so that the torque which is available in the drive shaft 31 may, under certain circumstances encountered in the field, reach extremely high values. Where the digger chain acts upon normal soil, the torque in the drive shaft does not exceed that required to move the digger chain and boom forwardly at the desired speed. It sometimes happens, however, that the earth includes obstructions in the form of rocks, hard clay, or even buried obstructions such as electrical or gas conduit or sewer lines. Upon striking such obstruction, the blades continue to apply maximum force. When the engine begins to "labor," the operator will normally stop the chain and swing the boom upwardly to determine the nature of the obstruction. Frequently, however, the operator cannot act quickly enough and the chain may be caught solidly, as by a piece of buried cable, thereby "killing" the tractor engine. Because of the high reduction ratio in the unit 30, particularly where a worm and worm wheel are used, the stoppage of the engine does not release the torque which exists in the system between the tractor rear wheels and the drive shaft 31. Nor does throwing out the clutch of the engine serve to release such torque. Because of the presence of the torque, it is normally impossible to slide the driving gear 37 endwise relative to the gear 35 (Fig. 2) for disengagement, and the transmission remains in a "locked-up" condition. This condition can be relieved by reversing the direction of the tractor power take-off. Provision for such reversal is made on certain vehicles such as the well-known jeep. However, in the case of a conventional form of tractor, the power take-off rotates only in one direction and cannot be reversed.

It is one of the features of the present device that the above condition may be easily and quickly relieved without thought on the part of the operator and simply by moving the manual control arm 45 from the "drive" position to the "disengage" position. Thus, referring to Fig. 6, it will be noted that initial movement of the control lever 45 from the drive position accomplishes two effects. First of all, the sector plate 47 is rotated counterclockwise which, via link 89, imparts counterclockwise rotation to the fork 85, moving the annular cam member 75 (Fig. 7) to the right to release the locking balls 70. During this movement the gear 37 cannot move because of the friction at the gear teeth, and the relative movement between the arm 48 and the manual lever 45 is taken up by the spring 52. Because of the high torque existing between the shaft 31 and the gear 63, release of the locking balls enables the locking collar 64 to move immediately to the right under the camming action between the teeth 66, 67, thereby permitting relative movement of the gear 63 and relieving the torque. This serves to "unload" the gear 37 so that continued movement of the control lever 45 into the disengaged position permits easy endwise sliding of the gear 37 relative to the spur gear 35 in the tractor under the urging of spring 52.

When the driving connection between the speed reducer 30 and the tractor rear wheels is broken as described above, the torque load is taken off of the tractor wheels 11, allowing the entire vehicle to yield backwardly in response to the relative force exerted by the obstruction. This releases the pressure applied by the digger blades against the obstruction and permits the boom to be swung upwardly clear of the ground so that the obstruction may be inspected or removed. The tractor operator will normally not be aware of the amount of torque existing between the drive shaft 31 and the gear 63 since the torque may vary over wide limits depending upon the nature of the obstruction. Regardless of the type of obstruction or the amount of torque, simply moving the control lever 45 into the "disengage" position completely unlocks the driving system and overcomes any disadvantage which may be associated with a unidirectional power take-off.

I claim as my invention:

1. In a tractor-type trenching device for use with a tractor having a transmission and a power take-off, the combination comprising an auxiliary speed-reducing mechanism powered by the power take-off, a drive unit mounted on the tractor transmission housing, said drive unit having a slidably mounted output gear movable between a disengaged position and an engaged position in mesh with an output gear in the tractor transmission, an unlocking device interposed between the speed-reducing mechanism and the output gear for releasing the torque exerted by said speed-reducing mechanism, and manually operated means for sequentially (a) unlocking said unlocking device and (b) shifting said output gear from its engaged position to its disengaged position.

2. In a tractor-type trenching device for use with a tractor having a transmission and a power take-off, the combination comprising an auxiliary speed-reducing mechanism powered by the power take-off, a drive unit mounted on the tractor transmission housing, said drive unit having a slidably mounted output gear movable between a disengaged position and an engaged position in mesh with an output gear in the tractor transmission, an unlocking device interposed between the speed-reducing mechanism and the output gear, said unlocking device having means including an unlocking member for breaking the torque connection therein, and manually operated means for sequentially (a) moving the unlocking member in said unlocking device and (b) shifting said output gear from its engaged position to its disengaged position.

3. In a tractor-type trenching device for use with a tractor having a transmission providing an output gear as well as a power take-off, the combination comprising a speed reducer connected to the power take-off, a drive unit, said drive unit having an unlocking device and having a slidably mounted gear arranged for normal meshing with the output gear in the tractor transmission, said unlocking device having an unlocking member and arranged to break the torque connection when the member is moved, a manual control member for moving said unlocking member and for moving the slidably mounted gear to the disengaged position, and a resilient connection interposed between the manual control member and the slidable gear to permit sequential (a) release of torque and (b) slidable disengagement of the sliding gear.

4. In a tractor-type trenching device for use with a tractor having a transmission providing an output gear as well as a power take-off, the combination comprising a speed reducer connected to the power take-off, a drive unit, said drive unit having an unlocking device and having a slidably mounted gear arranged for normal meshing with the output gear in the tractor transmission, said unlocking device having an unlocking member and arranged to break the torque connection when the member is moved, a manual control member for moving said unlocking member and for moving the slidably mounted gear to the disengaged position, and a resilient connection interposed between the manual control member and the slidable gear to permit sequential (a) release of torque and (b) slidable disengagement of the sliding gear, a winch, and means actuated upon continued movement of the manual operator beyond the "disengage" position for coupling the speed reducer to the winch.

5. An unlocking device for use in an automotive transmission or the like comprising, in combination, a shaft having a collar thereon slidable axially between an engaged position and a disengaged position, said collar and shaft being in splined engagement with one another, a gear freely rotatable on said shaft, said collar and said gear each being provided with a set of axially opposed tapered teeth, an annular member spaced from said collar at the end thereof opposite said teeth to define an annular groove, a plurality of balls, means including an annular cam for camming said balls into said groove so that said collar is forced endwise into its engaged position, and control means for moving said annular cam endwise to release said balls and thereby to allow the teeth on said collar to become disengaged from the teeth of said gear.

6. An unlocking device for use in an automative transmission or the like comprising, in combination, an input shaft having a locking member rotatable therewith and slidable axially between first and second positions, an output member axially alined with respect to said input shaft, said locking member and said output member each being provided with a set of axially opposed tapered teeth, an annular member spaced axially from said locking member at the end thereof opposite said teeth to define an annular groove, a plurality of balls, means including an annular cam for camming said balls into said groove so that said locking member is forced endwise from a first position to a second position in which the tapered teeth are engaged with one another, and control means for moving said annular cam endwise to release said balls and thereby allowing the teeth on said locking member to become disengaged from the teeth on said output member.

7. In a tractor-type trenching device for use with a tractor having a transmission and a power take-off, the combination comprising an auxiliary speed-reducing mechanism powered by the power take-off, a drive unit mounted on the tractor transmission housing and coupled to said speed reducing mechanism, said drive unit having a slidably mounted spur gear movable between an engaged position in which it is coupled to an output gear in the tractor transmission and a disengaged position in which it is uncoupled therefrom, an unlocking device interposed between the speed-reducing mechanism and the output gear for releasing the torque exerted by said speed-reducing mechanism, and manually operated means for sequentially (a) unlocking said unlocking device and (b) shifting said spur gear from its engaged position to its disengaged position.

8. In a tractor-type trenching device for use with a tractor having a transmission and a power take-off, the combination comprising an auxiliary speed-reducing mechanism powered by the power take-off, a drive unit mounted on the tractor transmission housing and coupled to the speed-reducing mechanism, said drive unit having output gear means including a member slidably movable between a coupled position in which it provides positive coupling to an output gear in the tractor transmission and an uncoupled position in which it is uncoupled therefrom, an unlocking device interposed between the speed-reducing mechanism and the output gear, said unlocking device having means including an unlocking member for breaking the torque connection therein, and manually operated means for sequentially (a) moving the unlocking member in said unlocking device and (b) shifting said slidable member from its engaged position to its disengaged position.

References Cited in the file of this patent

UNITED STATES PATENTS

| | | |
|---|---|---|
| 1,379,891 | Aichele | May 31, 1921 |
| 2,248,133 | Snow | July 8, 1941 |
| 2,276,000 | Stumpf | Mar. 10, 1942 |
| 2,311,265 | Stumpf | Feb. 16, 1943 |
| 2,325,492 | Erickson | July 27, 1943 |
| 2,443,901 | Fast | June 22, 1948 |
| 2,459,361 | Carnagua et al. | Jan. 18, 1949 |
| 2,661,935 | Willard | Dec. 8, 1953 |